United States Patent [19]
Cwirzen

[11] 4,062,053
[45] Dec. 6, 1977

[54] PROTECTOR MODULE

[75] Inventor: Casimir Cwirzen, Wheeling, Ill.

[73] Assignee: Cook Electric Company, Morton Grove, Ill.

[21] Appl. No.: 642,914

[22] Filed: Dec. 22, 1975

[51] Int. Cl.[2] .......... H02H 7/20

[52] U.S. Cl. .......... 361/119; 337/32; 361/120; 361/124

[58] Field of Search .......... 317/61, 62, 66; 337/31-34; 339/14 R, 14 P, 147 R, 147 C; 361/117, 119, 120, 124

[56] References Cited

U.S. PATENT DOCUMENTS

| | | | |
|---|---|---|---|
| 3,319,316 | 5/1967 | Geyer | 29/200 P |
| 3,411,040 | 11/1968 | Dietz | 317/62 |
| 3,703,665 | 11/1972 | Yereance et al. | 317/61 |
| 3,818,271 | 6/1974 | Baumbach | 317/66 X |
| 3,889,222 | 6/1975 | Takano et al. | 317/66 X |
| 3,901,576 | 8/1975 | Berman | 337/34 X |

*Primary Examiner*—A. D. Pellinen
*Attorney, Agent, or Firm*—Mason, Kolehmainen, Rathburn & Wyss

[57] ABSTRACT

A protector module for use in mounting a gas tube arrester or carbon arrester assembly in a telephone central office protection system has an insulating base and a conductive case or cover. The base has a channel with a projecting stop on one side, in which channel is disposed a portion of a line contact. Another portion of the line contact extends through the base and is positioned against an upstanding wall located at one end on the other side of the base, in which side the gas tube arrester or carbon arrester assembly is disposed. The case is secured about the other side and the upstanding wall by a plurality of spherical projections on the base which lodge in holes in the case. When the case is so positioned on the base, a line electrode of the gas tube arrester or carbon arrester assembly makes electrical contact with the line contact and a ground electrode of the gas tube arrester or carbon arrester assembly is coupled to the case.

15 Claims, 12 Drawing Figures

Fig. 1
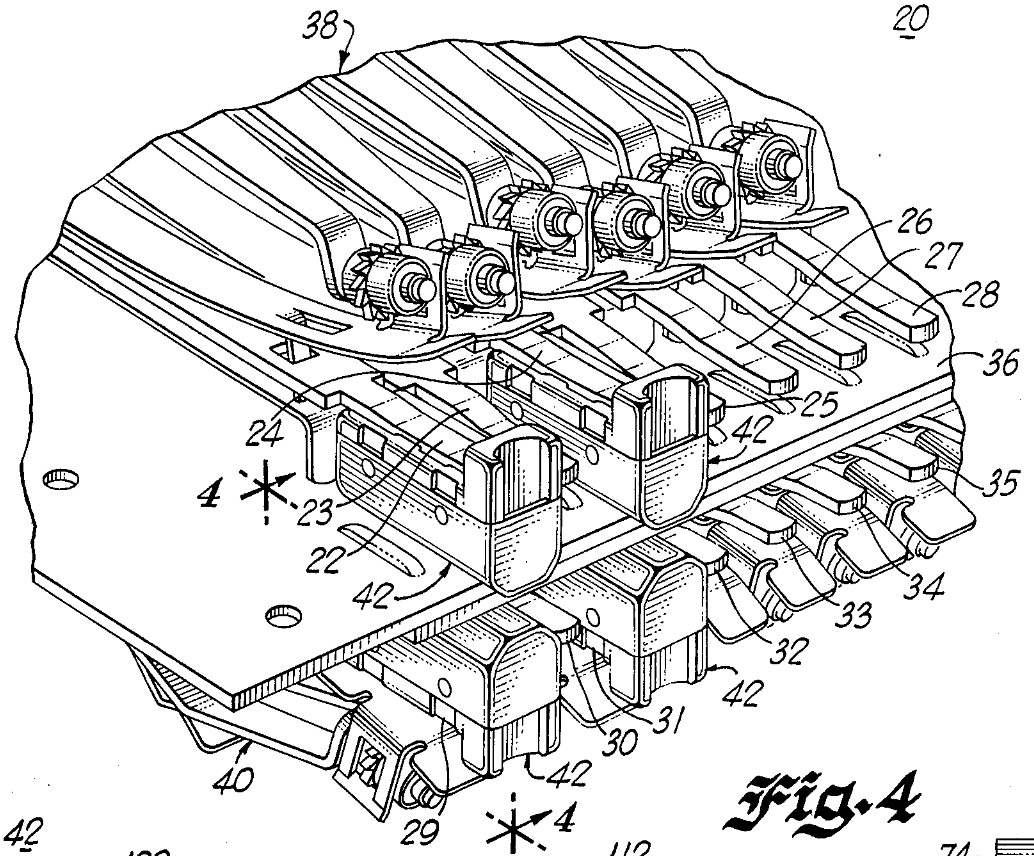
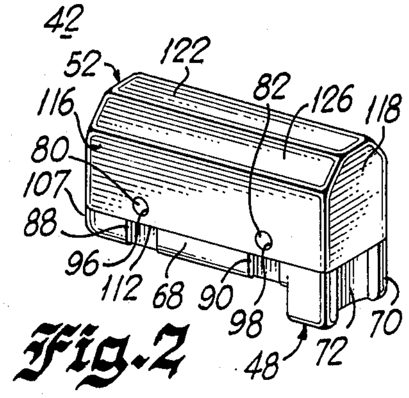
Fig. 2
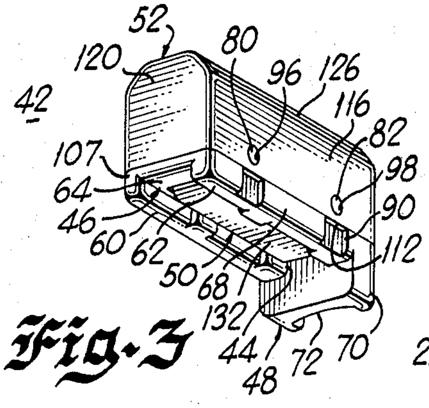
Fig. 3
Fig. 4
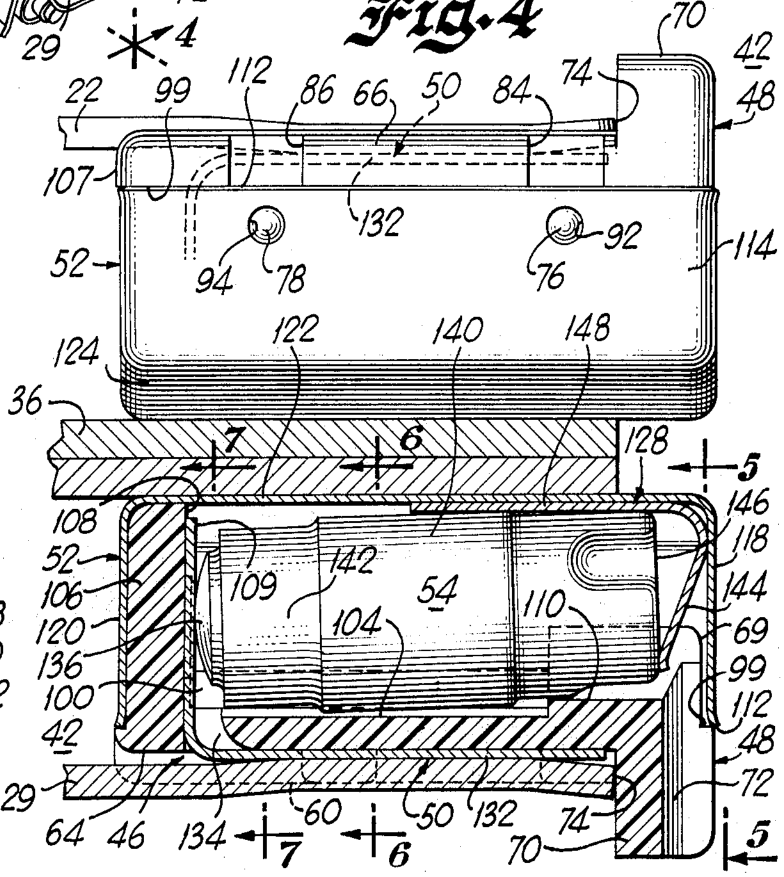

PROTECTOR MODULE

This invention relates to protection systems in telephone central offices, and more particularly, to a new and improved protector module for mounting gas tube or carbon type arresters in telephone central office protection systems.

In a telephone central office, it is necessary to provide a protection system against high voltage and sneak currents that might occur on outside cables or that might be injurious to personnel and switching equipment. One such type of protection system has a plurality of line or terminal contact bars that are normally maintained in a spaced relationship to a ground plate. Each of the terminal contact bars is connected to a cable and/or equipment that must be protected from such high voltages and sneak currents. To so protect these cables and/or equipment, a gas tube or carbon type of arrester is placed between the terminal contact bar and the ground plate. Since the terminal contact bars are resiliently biased toward the ground plate, the arresters are secured between the terminal contact bars and the ground plate due to the force exerted by the terminal contact bars against the arresters themselves or the holders or protector modules in which the arresters are disposed.

For each of the arresters so positioned between a terminal contact bar and the ground plate, a line electrode of the arrester is coupled to the terminal contact bar and a ground electrode of the arrester is coupled to the ground plate. Since a spark gap between the electrodes normally is in an open circuit mode, the terminal contact bar is not coupled to the ground plate. However, if a high voltage or surge occurs on the line connected to the terminal contact bar, the spark gap is sparked over (or short circuited) such that the electrodes are coupled together and any surge current on the line is permitted to flow to ground potential through the ground plate instead of to telephone equipment connected to that line.

Any holder or module that is used for securing a gas tube or carbon type arrester or assembly between the terminal contact bar and the ground plate should meet certain design criteria. First, the holder should allow standard forms of gas tube arresters or carbon type arrester assemblies to be rather easily mounted between the terminal contact bar and the ground plate in the telephone central office protection system. Second, the holder or module should not contain any low temperature, flammable materials that could ignite or deform at temperatures which are attained when power crosses or the like occur through the arrester (especially gas tube arresters) due to the high voltages or sneak currents. Third, the holder or module should position the arrester between the terminal contact bar and the ground plate in such a manner that adequate heat or thermal transfer paths are provided between the arrester, and particularly, a gas tube arrester and the heat sinks formed by the terminal contact bar and the ground plate. Fourth, the holder or module should not interfere with or prevent the fail-safe use of gas tube arresters in the telephone central office protection system, or the use of fail-safe types of carbon arrester assemblies so that lines connected to the terminal contact bar are never totally unprotected.

One such type of holder for a gas tube arrester utilized in such protection systems is disclosed and claimed in U.S. Pat. No. 3,901,576, which patent is assigned to the assignee of the present application. Although the holder therein described and claimed has certain advantages over the prior art referred to in that patent, it has been found that such a holder in certain circumstances did not adequately position the gas tube arrester between the terminal contact bar and the ground plate such that adjacent holders or arresters might come in contact. Moreover, such a holder could not be utilized with carbon type of arresters, or carbon types of arrester assemblies.

Accordingly, objects of the present invention are to provide a new and improved protector module for gas tube arresters or carbon type arrester assemblies; to provide a new and improved protector module in which can be disposed a gas tube arrester or carbon arrester assembly and which can be easily mounted in a telephone central office central protection system; to provide a new and improved protector module that facilitates the mounting and positioning of gas tube arresters or carbon type arrester assemblies in existing telephone central office protection systems; to provide a new and improved protector module in which the only electrically exposed portion of the module is at ground potential so that the likelihood of shock hazard to personnel installing or withdrawing the module is decreased; to provide a new and improved protector module which can be easily assembled without the need for special tools; to provide a new and improved protector module which has a multiplicity of flat surfaces on which data can be marked; to provide a new and improved arrester module in which can be disposed standard carbon type of arrester assemblies and which does not interfere with the movement of portions of such an arrester assembly; to provide a new and improved protector module which decreases the amount of current flow through a compression spring which is utilized in a carbon type of arrester assembly used in such a module; to provide a new and improved protector module that does not have any low temperature, flammable materials that might be deformed as a result of heat generated during power crosses from high voltage or sneak currents on the telephone lines; to provide a new and improved protector module that provides adequate heat transfer paths between the arrester (particularly a gas tube arrester) used in the module and a heat sink consisting of the ground plate of the telephone central office protection system in which the arrester is mounted; and to provide a new and improved protector module that enables the fail-safe usage of arresters in telephone central office protection systems.

In accordance with these and many other objects of the present invention, an embodiment of the present invention comprises a protector module for use in a telephone central office protection system having terminal contact bars coupled to telephone lines or cables to be protected and resiliently biased toward a ground plate. The protector module includes an insulating base and a conductive cover or case. An elongated channel is formed on one side of the base, at one end of which is a projecting ear or stop and in which is disposed a contact portion of a line contact. The other side of the base has elongated, opposed beveled edges forming an open chamber with an upstanding end wall at one end, adjacent which the other or electrode portion of the line contact is disposed. A gas tube arrester or carbon arrester assembly having line and ground electrodes is received in the chamber such that the line electrode makes contact with the electrode portion of the line contact and the ground electrode is coupled to the case which covers the open chamber and the upstanding end wall. The cover is secured to the base by means of spherical projections on the side edges of the base which extend through mating holes in the case.

When the gas tube arrester is disposed in the chamber, a ground spring couples the ground electrode to the case and forces the line electrode against the electrode portion of the line contact. On the other hand, when a carbon arrester assembly is disposed in the chamber, the ground electrode is coupled to the case through a fusible element and through a grounding basket and a compression spring. The compression spring also forces the components of the carbon arrester assembly together and forces the line electrode against the electrode portion of the line contacts. In either case, the protector module is slidable between the terminal contact bar and the ground plate such that the terminal contact bar is received in the channel portion of the base and makes contact with the contact portion of the line contact and a flat, outer surface of the case is forced against the ground plate.

Many other objects and advantages of the present invention will become apparent from considering the following detailed description in conjunction with the drawings in which:

FIG. 1 is a partially cut away, perspective view of a portion of a telephone central office protection system, illustrating the use of protector modules embodying the present invention in that telephone central office protection system;

FIG. 2 is a side perspective view of the protector module made in accordance with the present invention and shown in FIG. 1;

FIG. 3 is a bottom perspective view of the protector module of FIG. 2;

FIG. 4 is a cross-sectional view taken along line 4—4 of FIG. 1 of a portion of the protection system shown in FIG. 1 illustrating the use of a gas tube arrester in the protector module;

Figure 5:
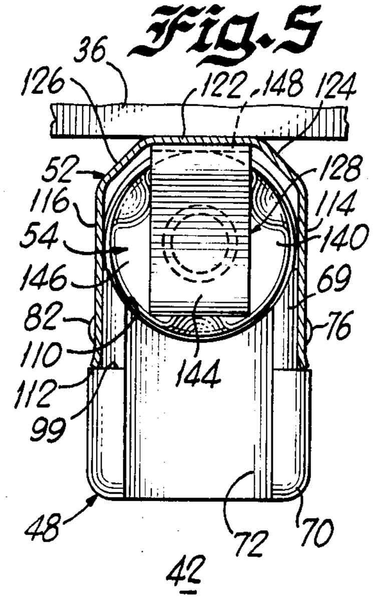
Figure 6:
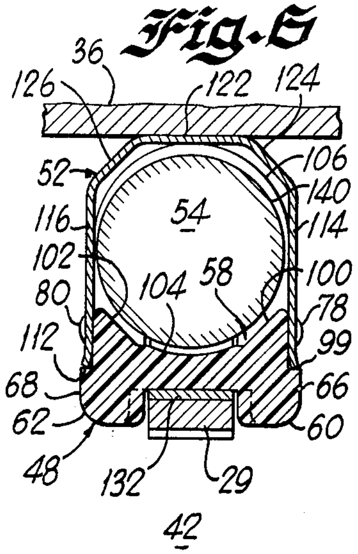
Figure 7:
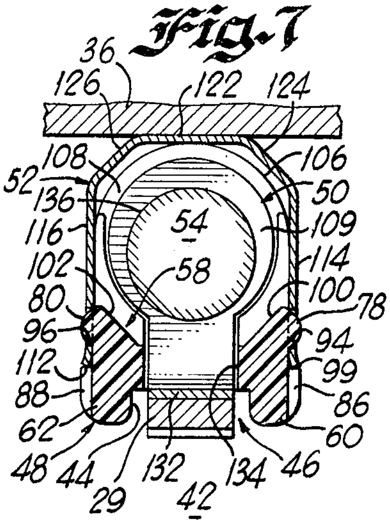
Figure 8:
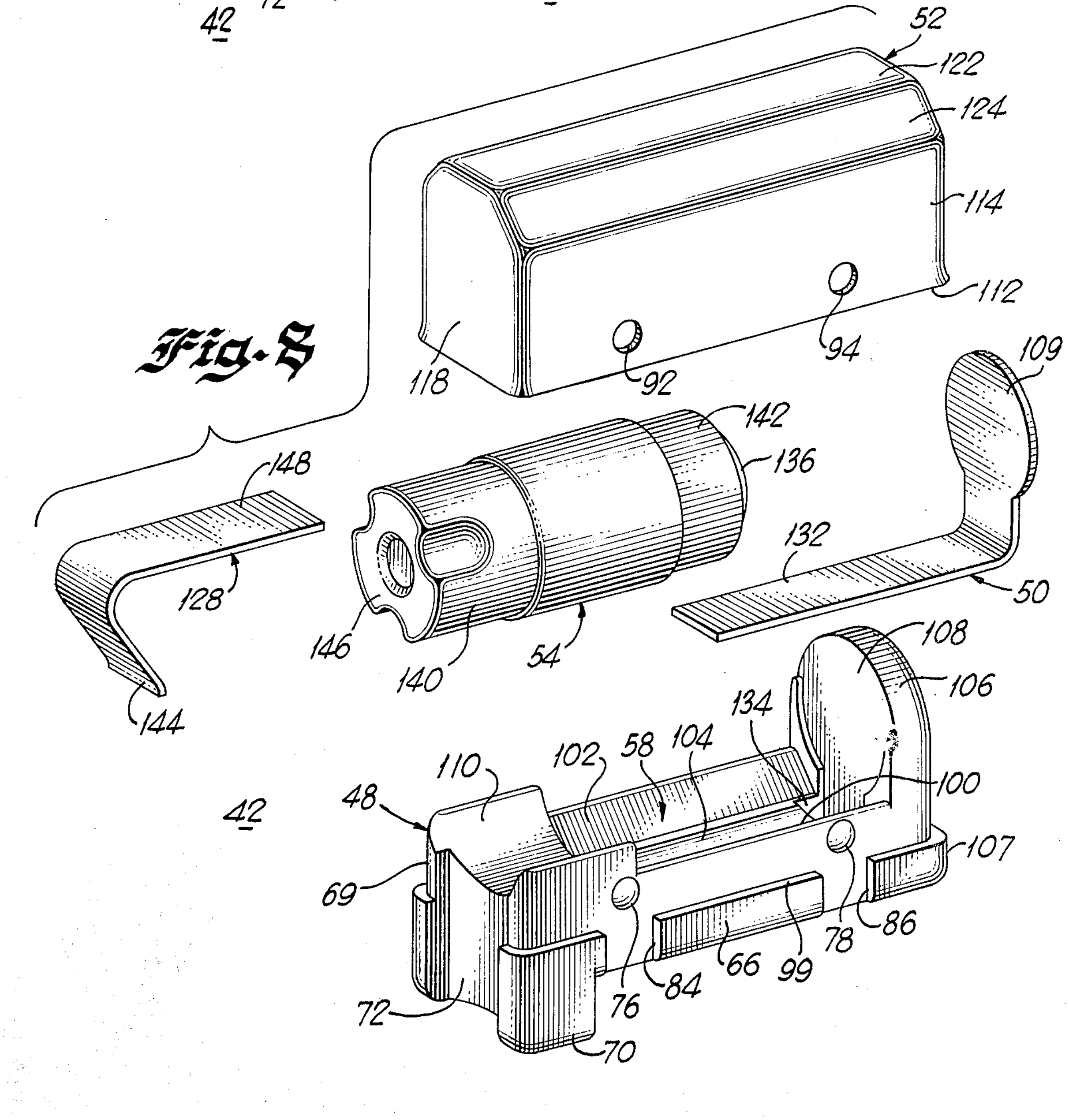
Figure 9:
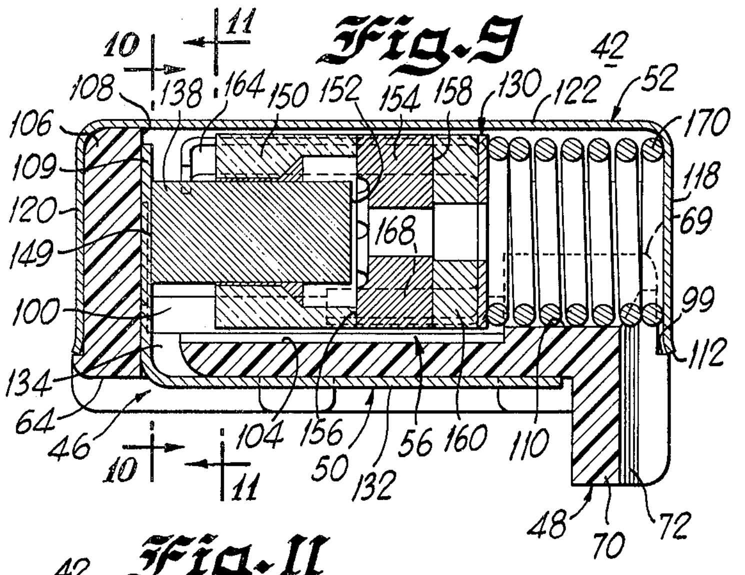
Figure 10:
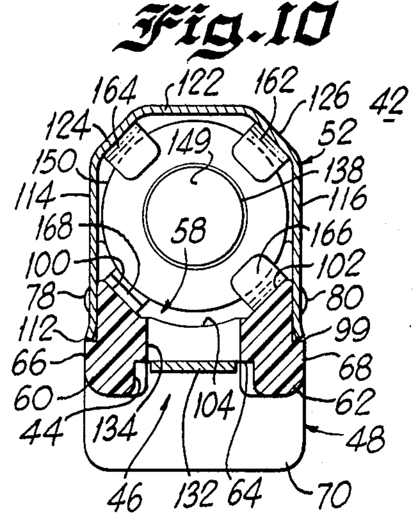
Figure 11:
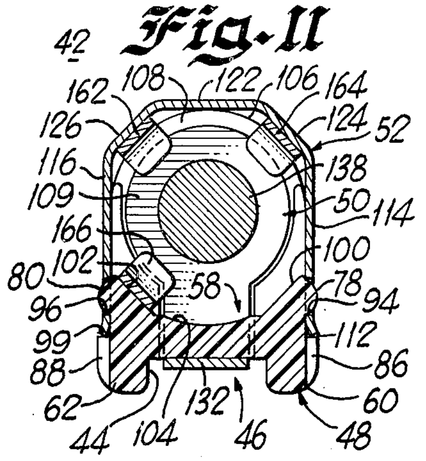
Figure 12:
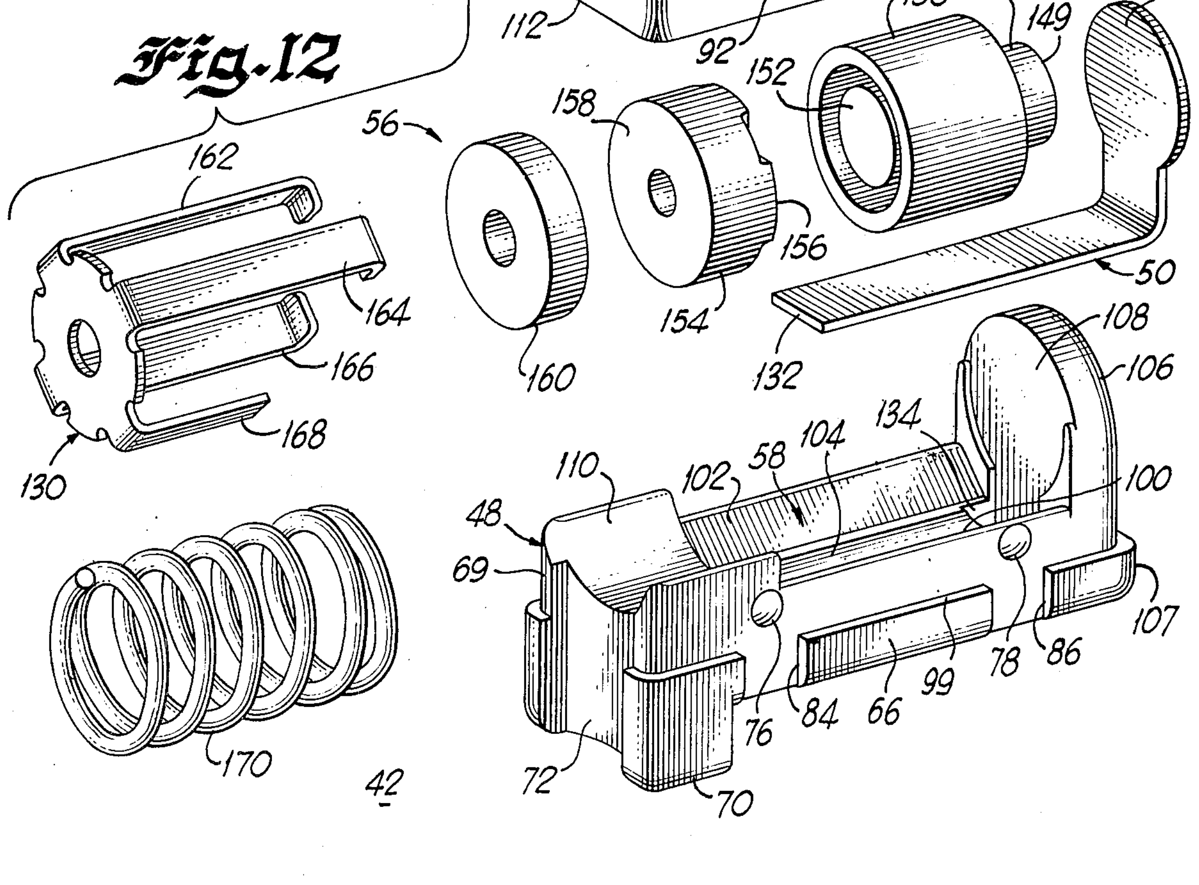

FIG. 5. is a cross-sectional view of one of the protector modules of FIG. 4 taken along line 5—5 of FIG. 4;

FIG. 6 is a cross-sectional view of one of the protector modules of FIG. 4 taken along line 6—6 of FIG. 4;

FIG. 7 is a cross-sectional view of one of the protector modules shown in FIG. 4 taken along line 7—7 of FIG. 4;

FIG. 8 is an exploded view of the protector module of FIGS. 4, 5, 6 and 7, disclosing the various components of the protector module;

FIG. 9 is a cross-sectional view of a protector module of FIGS. 2 and 3 with a carbon type of arrester assembly disposed therein;

FIG. 10 is a cross-sectional view of the protector module of FIG. 9 taken along line 10—10 of FIG. 9;

FIG. 11 is a cross-sectional view of the protector module of FIG. 9 taken along line 11—11 of FIG. 9; and FIG. 12 is an exploded view of the protector module of FIGS. 9, 10 and 11 illustrating the various components of that protector module.

Referring now more specifically to FIG. 1 of the drawings, therein is disclosed a portion of a telephone central office protection system which is used in protecting telephone lines, cables, equipment, or the like from high voltage or surge currents, and which is generally indicated by the number 20. The protection system 20 includes a number of line or terminal contact bars 22–35 positioned on either side of a ground plate 36. Each of the terminal contact bars 22–35 is coupled to an individual line, cable or equipment that is to be protected by the telephone central office protection system 20 and the ground plate 36 is coupled to ground potential. The terminal contact bars 22–28 are resiliently biased toward the ground plate 36 by bias mechanisms generally indicated as 38. Likewise, the terminal contact bars 29–35 are resiliently biased toward the ground plate 36 by bias mechanisms generally indicated as 40.

In order to protect the lines, cables or equipment coupled to the terminal contact bars 22–35, a protector module, which is generally designated by the numeral 42 and which embodies the present invention, is inserted between any one of the terminal contact bars 22–35 and the ground plate 36. In the illustrative embodiment of the telephone central office protection system shown in FIG. 1, a protector module 42 is inserted between the ground plate 36 and the terminal contact bars 22, 24, 29, and 31. It should be understood that a protector module 42 can be inserted between any or all of the terminal contact bars 22–35 and the ground plate 36, and the positioning of the protector modules 42 between the terminal contact bars 22, 24, 29, and 31, in the illustrative embodiment of FIG. 1, is only for illustrative purposes.

As set forth in more detail hereinafter, and as discussed in connection with the protector module 42 inserted between the terminal contact bar 22 or 29 and the ground plate 36, the protector module 42 can be slid between any one of the terminal contact bars 22–35, such as the terminal contact bar 29, and the ground plate 36 so that the terminal contact bar 29 is received in a channel 44 formed on one side 46 of an insulating base 48 of the protector module 42. When the protector module 42 is so positioned between the terminal contact bar 29 and the ground plate 36, the terminal contact bar 29 makes physical and electrical contact with a line contact 50, which is partly disposed in the channel 44. In addition, a conductive case or cover 52 of the protector module 42 is forced against the ground plate 36 by the terminal contact bar 29 due to the force exerted on the terminal contact bar 29 by the biasing mechanisms 40.

Since the line contact 50 is coupled to one electrode of a gas tube arrester 54 (FIGS. 4–8) or a carbon arrester assembly 56 (FIGS. 9–12) and the case 52 is coupled to the other electrode of the gas tube arrester 54 or the carbon arrester assembly 56, a spark gap in the gas tube arrester 54 or the carbon arrester assembly 56 is coupled between the terminal contact bar 29 and the ground plate 36. Normally, this spark gap is in an open circuit condition, such that the terminal contact bar 29 is not coupled by the protector module 42 to the ground plate 36.

However, in the event that there is a high voltage condition that occurs on the line or cable coupled to the terminal contact bar 29, the spark gap in the gas tube arrester 54 or the carbon arrester assembly 56 located in the protector module 42 is sparked over, such that the spark gap is short circuited. When the spark gap is in this short circuit condition, the electrodes of the gas tube arrester 54 or the carbon arrester assembly 56 are coupled together thereby coupling the case 52 to the line contact 50. In this manner, the terminal contact bar 29 coupled to the line contact 50 is coupled to the ground plate 36 so that such high voltages or resulting surge currents on the line coupled to the terminal contact bar 29 are diverted to ground potential through the protector module 42.

More specifically, the base 48 is made of an insulating material that is not flammable or deformable by heat that might be developed when a high voltages or surge currents are diverted to the ground plate 36 through the protector module 42. In many instances, and particularly when the gas tube arrester 54 is utilized, the temperatures that are reached during such a power cross is in excess of 500° F., so that the materials selected for the base 48 must withstand such high temperatures without presenting a fire hazard or becoming degraded physically due to the heat so generated.

The base 48 has the one side 46 designed to receive the terminal contact bar 29 and has another side 58 (FIGS. 8 and 12) which is designed to receive the gas tube arrester 54 or the carbon arrester assembly 56. The side 46 has the channel 44 which is formed by a pair of opposed, elongated legs 60 and 62 which extend generally perpendicularly from a flat wall surface 64 and along side edges 66 and 68, respectively. At one end 69 of the base 48 is a projecting ear or stop 70 which extends generally perpendicularly from the wall surface 64 a distance greater than the distance the legs 60 and 62 extend from the surface 64. A curved surface or indentation 72 is formed in the stop 70 on the external side of the stop 70 or side opposite the channel 44. As a result, the stop 70 not only provides a positive stop against an end 74 of the terminal contact bar 29 when the protector module 42 is slid between the terminal contact bar 29 and the ground plate 36, but also provides an easy surface 72 by which personnel can conveniently push the protector module 42 between the terminal contact bar 29 and the ground plate 36 and provides a safe and convenient means by which the protector module 42 can be withdrawn from between the terminal contact bar 29 and the ground plate 36.

Along the side edge 66 is a pair of spherical projections 76 and 78 and along the side edge 68 is a similar pair of spherical projections 80 and 82. Adjacent the spherical projections 76 and 78 along the side edge 66 are notches 84 and 86, respectively. Likewise, adjacent the spherical projections 80 and 82 are notches 88 and 90, respectively. The spherical projections 76, 78, 80 and 82 are designed to mate with or be disposed in holes 92, 94, 96 and 98, respectively, in the case 52 when the case 52 is positioned on the base 48 such as illustrated in FIGS. 2 and 3 of the drawings. In addition, there is provided a ledge 99 about the periphery of the base 48 on which the case 52 rests when it is positioned on the base 48. In this manner, the case 52 can be securedly fixed to the base 48 without the necessity of special tools or the like. The notches 84, 86, 88 and 90 allow one to insert a tool or the like between the base 48 and the case 52 when it is desired to dislodge the case 52 from its secured position on the base 48.

The side 58 of the base 48 has opposed beveled side surfaces 100 and 102. The side surface 100 is adjacent the side edge 66 and the side surface 102 is adjacent the side edge 68 of the base 48. In the illustrated embodiment of the present invention, the side surfaces 100 and 102 are inclined at approximately a 45° angle from a curved support wall or surface 104. The surfaces 100, 102 and 104 extend along the elongated axis of the base 48 on the side 58 and terminate in an upstanding end wall 106 at an end 107 of the base 48. As will be described in more detail below, an inside surface 108 of the end wall 106 is designed to receive an electrode portion 109 of the line contact 50. At the other end 69 of the base 48, the surfaces 100, 102 and 104 terminate in a raised, curved surface 110, which is designed to receive either a portion of the gas tube arrester 54 or a portion of the carbon arrester assembly 56.

Unlike the base 48, the case or cover 52 of the protector module 42 is made of a conductive material and is designed to fit about or enclose the open side 58 of the base 48 including the wall 106. The case 52 is an elongated structure having one side 112 substantially open and having generally flat side surfaces 114 and 116, and flat end portions 118 and 120. The holes 92 and 94 are located near the open side 112 in the side surface 114. The holes 96 and 98 are similarly located in the side surface 116 adjacent the open side 112. Opposite the open side 112 is a contact surface 122 which is connected to the side surface 114 by a beveled or inclined surface 124 and to the side surface 116 by a beveled or inclined surface 126. In the disclosed embodiment, the surfaces 124 and 126 are inclined at an angle of 45° from the plane of the contact surface 122.

As will be described in more detail below, the contact surface 122 enables a stable and large area contact to be made between the protector module 42, and particularly, the case 52, and the ground plate 36 when the protector module 42 is positioned between the terminal contact bar 29 and the ground plate 36. The contact surface 122 also enables a rather large interface to be made with a ground spring contact 128 that is used in conjunction with the gas tube arrester 54. In addition, the beveled surfaces 124 and 126 and the surfaces 100 and 102 provide a registered sliding surface for a grounding basket 130 utilized in connection with the carbon arrester assembly 56.

As previously indicated, the line contact 50, and particularly a contact portion 132, is disposed within the channel 44 in the base 48 of the protector module 42. The line contact 50 extends through a slot 134 in the base 48, which slot 134 extends between the surface 64 and the support wall 104, such that an electrode portion 109 of the line contact 50 can be disposed against the inner circularly notched surface 108 of the upstanding wall 106 as specifically illustrated in FIGS. 4 and 9 of the drawings. The electrode portion 109 of the line contact 50 is generally circular in shape to fit properly against the similarly notched surface 108 and also to provide an adequate contact surface for a line electrode 136 of the gas tube arrester 54 or a line electrode 138 of the carbon arrester assembly 56. In this manner, when a protector module 42 is positioned between the terminal contact bar 29 and the ground plate 36, the line electrode 136 or the line electrode 138 is coupled to the terminal contact bar 29 through the line contact 50.

Referring now more specifically to FIGS. 4–8 of the drawings, therein is disclosed the protector module 42 with one type of arrester that can be used in the protector module 42, namely the gas tube arrester 54. The disclosed gas tube arrester 54 is one of several types of gas tube arresters having a line electrode 136 separated from a ground electrode 140 by a tubular, insulating or ceramic spacer 142. A portion of the line electrode 136 extends into the chamber formed by the ground electrode 140 and the spacer 142 so as to form a spark gap between the line electrode 136 and the ground electrode 140. Whenever a voltage of a sufficient magnitude is impressed on the line electrode 136, the spark gap between the line electrode 136 and the ground electrode 140 breaks down coupling the line electrode 136 to the ground electrode 140. Normally, there is sufficient available current caused by the overvoltage surge to cause the spark gap between the line electrode 136 and the ground electrode 140 to completely arc over such that the impedance between the line electrode 136 and the ground electrode 140 will be relatively small. In certain instances, there might be a sustained overvoltage condition which will cause the gas tube arrester 54 to be heated due to the current flow through the gas tube arrester 54 between the line electrode 136 and the ground electrode 140.

As particularly shown in FIGS. 4–7, the gas tube arrester 54 fits into the open side 58 of the base 48 and rests against a very small portion of the curved surface 110 and the surfaces 100, 102 and 104. In order to firmly position the gas tube arrester 54 in the protector module 42 and to insure that the line electrode 136 makes physical and electrical contact with the electrode portion 109 of the line contact 50, the ground spring 128 is inserted between the gas tube arrester 54 and the case 52. More specifically, a spring portion 144 of the ground spring 128 is forced against an end portion 146 of the ground electrode 140. When the case 52 is positioned on the base 48, a contact portion 148 of the ground spring 128 lies against a portion of the ground electrode 140 and electrically couples the ground electrode 140 to the case 52. As a result, the ground spring 128 not only provides a means to secure the gas tube arrester 54 in the protector module 42, but also provides the electrical connection between the ground electrode 140 and the case 52.

Since the flat contact surface 122 of the case 52 provides a large interface between the protector module case 52 and the ground plate 36 and the ground spring 128 is made of a material which can withstand temperatures that might be produced when an overvoltage condition occurs, there is provided an adequate thermal path between the ground electrode 140 of the gas tube arrester 54 and the ground plate 36. This is important because the ground plate 36 presents a generous heat sink to the gas tube arrester 54 such that when the gas tube arrester 54 is heated during such an overvoltage condition, the generated heat can be transferred to the heat sink formed by the ground plate 36 rather than to the other portions of the protector module 42, such as the base 48. Moreover, the gas tube arrester 54 is positioned on the base 48 so that there is only a small area of the gas tube arrester 54 in contact with the base 48. As a result, the base 48 will not be heated above temperatures that it is designed to withstand before being damaged.

Thus, the positioning of the protector module 42 with the gas tube arrester 54 disposed therein between the terminal contact bar 29 and the ground plate 36 provides protection for any lines or the like coupled to the terminal contact bar 29. More specifically, when an overvoltage situation occurs on the line coupled to the terminal contact bar 29, the overvoltage also is impressed on the line electrode 136 of the gas tube arrester 54 through the line contact 50 because the contact portion 132 of the line contact 50 is coupled to the terminal contact bar 29 in the channel 44 and the electrode portion 109 of the line contact 50 is coupled to the line electrode 136. The spark gap in the gas tube arrester 54 between the electrodes 136 and 140 sparks over such that the line electrode 136 is coupled to the ground electrode 140 and thereby to the ground plate 36 through the ground spring 128 and the case 52. In this manner, any overvoltages that occur on the lines coupled to the terminal contact bar 29 are diverted to the ground plate 36 or in other words to ground potential through the protector module 42.

When the carbon arrester assembly 56 is used in the protector module 42, the protector module 42 again enables overvoltages occurring on the line coupled to the terminal contact bar 29 to be diverted to the ground plate 36. The protector module 42 with the carbon arrester assembly 56 therein is depicted in FIGS. 9–12 of the drawings. The carbon arrester assembly 56 is similar to the type disclosed in Geyer U.S. Pat. No. 3,319,316. The carbon arrester assembly 56 has one end 149 of its line electrode 138 coupled to the electrode portion 109 of the line contact 50. The line electrode 138 is preferably a cylindrical, rod-shaped carbon electrode and is recessed within an annular, insulating spacer 150. Adjacent an end 152 of the line electrode 138 is disposed a carbon, disc-shaped ground electrode 154. An end 156 of the ground electrode 154 is spaced apart slightly from the end 152 of the line electrode 138 so that a spark gap is formed between the line electrode 138 and the carbon disc-shaped electrode 154. The end 156 of the carbon electrode 154 has a number of plateau areas and grooves that enhance the ability of the carbon arrester assembly 56 to withstand repeated overvoltage surges that might occur on the line coupled to the terminal contact bar 29. The particular configuration and advantages of these plateau areas and grooves are specifically set forth in Yearance et al. U.S. Pat. No. 3,703,665, which patent is assigned to the assignee of the present application. At another end 158 of the carbon electrode 154 is disposed a fusible disc or pellet 160 which is normally made of solder or the like. As can be particularly seen in FIG. 9, the grounding basket 130 and its resilient fingers 162, 164, 166, and 168 normally encompass the fusible disc 160, the electrode 154 and the ceramic spacer 150 with a portion of the line electrode 138 located therein. The various components of the carbon arrester assembly 56 are held in position within the protector module 42 by a compression spring 170.

More specifically, the compression spring 170 normally maintains the components of the carbon arrester assembly 56 in the configuration shown in FIGS. 9–11 of the drawings. In this configuration, the end 149 of the line electrode 138 is forced against the electrode portion 109 of the line contact 50, a spark gap is formed between the line electrode 138 and the ground electrode 154, and the fusible disc 160 is disposed between the electrode 154 and the grounding basket 130.

In the event that a high voltage occurs on the line coupled to the terminal contact bar 29, the voltage is impressed on the contact portion 132 of the line contact 50 when the protector module 42 is positioned between the terminal contact bar 29 and the ground plate 36. Since the line electrode 138 is coupled to the electrode portion 109 of the line contact 50, the high voltage causes the spark gap between the electrodes 138 and 154 to breakdown and thereby to be short circuited so that the voltage is passed through the fusible disc 160 to the grounding basket 130 and the compression spring 170.

As can be best seen in FIGS. 9–11, the electrical connection between the fusible disc 160 and the case 52 is through both the grounding basket 130 and the compression spring 170, because at least two of the fingers of the grounding basket 130, namely, the fingers 162 and 164, make electrical contact with the side beveled surfaces 126 and 124, respectively, and the compression spring 170 abuts against the end 118 of the case 52. In this manner, any current that flows through the carbon arrester assembly 56 once the spark gap breaks down during an overvoltage condition will not only pass through the compression spring 170, but also the fingers 162 and 164 of the grounding basket 130, to the case 52. This dual path for the current to the case 52 prevents the possibility of having the spring 170 be overheated due to the high wattage losses that might occur in the compression spring 170 if all the current was to flow through the compression spring 170 to the case 52. Consequently, any such current is diverted to the ground plate 36 through the case 52 such that the line coupled to the terminal contact bar 29 is protected.

In certain instances, a sustained overvoltage condition could occur which might damage the carbon electrodes 138 and 154 resulting in the line coupled to the terminal contact bar 29 being left unprotected. In order to insure that the line will always be protected, the carbon arrester assembly 56 has a fail-safe provision. In the event that a sustained overvoltage condition occurs which causes a large amount of current to flow through the shorted spark gap between the line electrode 138 and the ground electrode 154 for an extended period of time, the fusible disc 160 begins to melt after a sufficient amount of heat is generated. The force of the compression spring 170 causes the grounding basket 130 to move toward the electrode portion 109 of the line contact 50 until the fingers 162, 164 and 166 make contact with the electrode portion 109 of the line contact 50. The curved surface 110 provides an appropriate sliding surface for the compression spring 170 during this time, and the beveled sides 124 and 126 of the case 52 and the surfaces 100 and 102 on the base 48 likewise provide a registered sliding surface for the grounding basket 130. Consequently, the line contact 50 is directly coupled to the case 52 through the grounding basket 130. As a result, the terminal contact bar 29 is permanently coupled to the ground plate 36 so that any line coupled to the terminal contact bar 29 will be protected from high voltages or the like.

Advantageously, the configuration of the protector module 42 is such that the only exposed conductive portion is the case 52 which is maintained at ground potential when the protector module 42 is inserted between the terminal contact bar 29 and the ground plate 36. This is because the terminal contact bar 29 is substantially disposed in the channel 44 formed in the insulating base 48. Thus, personnel are not exposed to any shock hazards when installing or withdrawing the protector module 42. In addition, the configuration of the case 52 and particularly the flat outer surfaces 114, 116, 118 and 120 provide excellent surfaces on which data concerning the protector module 42 can be marked.

Although the present invention is described with reference to various illustrative embodiments thereof, it should be understood that numerous other modifications and embodiments of the invention can be devised by those skilled in the art that will fall within the spirit and scope of the principles of this invention.

What is claimed as new and desired to be secured by Letters Patent of the United States is:

1. A protector module for use in a protection system, said protector module comprising:

an elongated insulating base having first and second elongated, opposing sides, said first side having a channel means therein and said second side having receiving surfaces, a line contact means disposed in said channel means and extending through said base to said second side, an arrester disposed on said receiving surfaces and having one electrode coupled to said line contact means and having another electrode, and a conductive case means disposed on said second side of said base such that said arrester is enclosed in a closed cavity formed by said base and said case means, said case means being coupled to said other electrode of said arrester.

2. The protector module as set forth in claim 1 wherein said channel means is formed by a pair of leg means extending from a support surface on said first side of said base and including a projecting stop at one end of said channel means projecting from said support surface.

3. The protector module as set forth in claim 1 wherein said arrester is positioned on said second side on said receiving surfaces by a spring means which at least partially couples said other electrode to said case means.

4. The protector module as set forth in claim 1 wherein said base has a generally flat support surface with said first and second sides being on opposite sides of said support surface.

5. The protector module as set forth in claim 1 wherein said case means has at least one flat elongated surface and wherein said arrester is a gas tube arrester having its other electrode coupled to said case means by a conductive spring means, said spring means positioning said gas tube arrester on said second side so that its one electrode is forced against said line contact means and having at least one generally flat portion positioned between and in contact with said other electrode and said flat surface of said case means.

6. The protector module as set forth in claim 1 wherein said arrester is a carbon arrester assembly having its other electrode coupled to said case means through a fusible pellet and a grounding basket or spring means and said line contact means has an electrode portion such that when said fusible pellet melts said grounding basket is forced against said electrode protector of said line contact means by said spring means.

7. A protector module for mounting an arrester having line and ground electrodes in a telephone protection system, said protector module comprising:

an insulating base having a supporting surface with a channel along a first side of said supporting surface and a second side for said arrester, said base having a projecting stop extending from said first side at one end of said channel, contact means extending along said channel through said supporting surface to the second side of said base so as to be coupled to said line electrode of said arrester, and a conductive case means mounted on said second side such that said arrester is enclosed by said case means and said base, said case means being coupled to said ground electrode of said arrester.

8. The protector module as set forth in claim 7 wherein said base has spherical projection means along the opposed side edges and wherein said conductive case means has detent means in which said projection means are disposed when said case means encompasses said arrester.

9. The protector module as set forth in claim 8 wherein said base has notch means along said side edges adjacent said projections.

10. The protector module as set forth in claim 7 wherein said base includes ledge means on which said case means is at least partially disposed.

11. The protector module as set forth in claim 7 wherein said base includes an upstanding wall at one end of said second side, said upstanding wall having a portion of said contact means positioned adjacent to it.

12. The protector module as set forth in claim 7 wherein said protecting stop has an indented surface on a side opposite from said channel.

13. The protector module as set forth in claim 7 wherein said case means includes a flat contact surface and first and second beveled surfaces extending from said contact surface and said base includes third and fourth beveled surfaces for receiving said arrester.

14. The protector module as set forth in claim 13 wherein said arrester is a carbon arrester assembly having spring means disposed between said case means and a grounding basket, said grounding basket being coupled to said ground electrode and having finger means in contact with said beveled surfaces.

15. The protector module as set forth in claim 14 wherein said grounding basket is coupled to said ground electrode through a fusible pellet such that when said fusible pellet melts said finger means move along said beveled surfaces under the influence of said spring means so as to make contact with said contact means.

* * * * *